United States Patent
Tanneberg et al.

(10) Patent No.: US 12,514,976 B2
(45) Date of Patent: Jan. 6, 2026

(54) METHOD FOR DETERMINING SYRINGE PARAMETERS BY A SYRINGE PUMP, AND APPARATUSES

(71) Applicant: Fresenius Medical Care Deutschland GmbH, Bad Homburg (DE)

(72) Inventors: Michael Tanneberg, Erfurt (DE); Thomas Nuernberger, Burkardroth (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 1081 days.

(21) Appl. No.: 17/612,409

(22) PCT Filed: May 19, 2020

(86) PCT No.: PCT/EP2020/063958
§ 371 (c)(1),
(2) Date: Nov. 18, 2021

(87) PCT Pub. No.: WO2020/234292
PCT Pub. Date: Nov. 26, 2020

(65) Prior Publication Data
US 2022/0241495 A1   Aug. 4, 2022

(30) Foreign Application Priority Data
May 21, 2019   (DE) .................. 10 2019 113 460.9

(51) Int. Cl.
*A61M 5/145*   (2006.01)
*A61M 1/36*   (2006.01)
(Continued)

(52) U.S. Cl.
CPC ........ *A61M 5/14546* (2013.01); *A61M 1/367* (2013.01); *A61M 5/1458* (2013.01);
(Continued)

(58) Field of Classification Search
CPC ................ A61M 5/1456; A61M 5/172; A61M 5/31526; A61M 5/31578;
(Continued)

(56) References Cited

U.S. PATENT DOCUMENTS 5,034,004 A   7/1991   Crankshaw
5,139,484 A *  8/1992   Hazon ................ A61M 5/1456
                                                              604/154
(Continued)

FOREIGN PATENT DOCUMENTS

DE   102007044413 A1   3/2009
WO   2004/052429 A1   6/2004

OTHER PUBLICATIONS

International Search Report and Written Opinion in International Appln. No. PCT/EP2020/063958, dated Aug. 27, 2020, 19 pages (with English translation).

*Primary Examiner* — Michael J Tsai
*Assistant Examiner* — Forrest Blake Dipert
(74) *Attorney, Agent, or Firm* — Fish & Richardson P.C.

(57) ABSTRACT

The present disclosure relates to a method for determining syringe parameters. It encompasses, as a first step, the providing of a medical syringe pump with a syringe receptacle having a syringe inserted herein, a drive unit for a slide, a counting device for counting motor steps, at least one sensor, a control device and a storage device. The method as described herein also encompasses, as further steps, moving the slide successively at different positions corresponding to known nominal volumes of the syringe. In a further step, the difference between these two positions is determined and, finally, optionally a number of motor steps of the drive unit of the syringe pump is calculated per nominal volume unit with respect to the inserted syringe.

20 Claims, 3 Drawing Sheets

(51) Int. Cl.
*A61M 5/315* (2006.01)
*G01B 7/00* (2006.01)
*G16H 20/17* (2018.01)

(52) U.S. Cl.
CPC ............ *G01B 7/003* (2013.01); *G16H 20/17* (2018.01); *A61M 2005/14506* (2013.01); *A61M 5/1456* (2013.01); *A61M 5/31526* (2013.01); *A61M 5/31578* (2013.01); *A61M 2005/31588* (2013.01); *A61M 2205/3317* (2013.01); *A61M 2205/3327* (2013.01); *A61M 2205/52* (2013.01); *A61M 2205/70* (2013.01)

(58) Field of Classification Search
CPC .... A61M 2005/14506; A61M 2005/52; A61M 2005/3327; A61M 2005/3334
See application file for complete search history.

(56) References Cited

U.S. PATENT DOCUMENTS

| | | | |
|---|---|---|---|
| 5,236,416 A | 8/1993 | McDaniel et al. |
| 5,651,775 A | 7/1997 | Walker et al. |
| 8,715,215 B2 | 5/2014 | Kopperschmidt |
| 2017/0095638 A1 | 4/2017 | Young et al. |

* cited by examiner

METHOD FOR DETERMINING SYRINGE PARAMETERS BY A SYRINGE PUMP, AND APPARATUSES

CROSS-REFERENCE TO RELATED APPLICATIONS

The present application is the national stage entry of International Patent Application No. PCT/EP2020/063958, filed on May 19, 2020, and claims priority to Application No. 10 2019 113 460.9, filed in the Federal Republic of Germany on May 21, 2019, the disclosures of which are expressly incorporated herein in their entireties by reference thereto.

TECHNICAL FIELD

The present disclosure relates to a method for determining syringe parameters as described herein. It further relates to a medical syringe pump as described herein and to a blood treatment apparatus as described herein. The present disclosure further relates to a digital storage medium as described herein, a computer program product as described herein, and a computer program as described herein.

BACKGROUND

Syringe pumps are known from practical experience. The associated pump control requires signals, which refer to defined positions of the linear movement of a movable slide of the syringe pump, by which the syringe is emptied. These signals are registered by sensors, which may be, for example, magnetic field sensors (e.g., Hall sensors) or optoelectronic sensors (e.g., light barriers), but may also be absolute position detectors (e.g., linear potentiometers). The sensors of these syringe pumps, therefore, serve the pump control for determining the actual position of the slide and hence accurate controlling of the pump motor.

To ensure a correct and precise controlling of the motor, the syringe pump must undergo a calibration process in advance. This may be carried out, e.g., as described in DE 10 2018 108 203.7 of the present applicant, but may also be executed by any other calibration method.

SUMMARY

An advantage of the present disclosure is to describe a further, e.g., automated or mostly automated, method for determining syringe parameters of a syringe to be used in the future, or for setting the syringe pump in order to be used with a further syringe type. In addition, a medical syringe pump, which is configured and/or prepared for executing such a method, and a blood treatment apparatus are specified. Furthermore, a suitable digital storage medium, a suitable computer program product and a suitable computer program for executing the method are specified.

An aspect of the present invention is achieved by a method as described herein. It is further achieved by a medical syringe pump as described herein and by a blood treatment apparatus as described herein. Furthermore, an aspect of the present invention is achieved by a digital storage medium as described herein, by a computer program product as described herein, and by a computer program as described herein.

In all the following statements, the use of the expression "may be" or "may have" and so on, is to be understood synonymously with "preferably is" or "preferably has," and so on respectively, and is intended to illustrate embodiments according to the present disclosure.

Whenever numerical words are mentioned herein, the person skilled in the art shall recognize or understand them as indications of numerical lower limits. Unless it leads the person skilled in the art to an evident contradiction, the person skilled in the art shall comprehend the specification for example of "one" as encompassing "at least one". This understanding is also equally encompassed by the present invention as the interpretation that a numerical word, for example, "one" may alternatively mean "exactly one", wherever this is evidently technically possible for the person skilled in the art. Both are encompassed by the present disclosure and apply herein to all used numerical words.

Herein, when "programmed" or "configured" is mentioned, it is also disclosed that these terms are interchangeable.

The information "top" and "bottom" are herein to be understood in case of doubt by the person skilled in the art as absolute or relative spatial information, which refers to the orientation of the respective component when used as intended.

The method described herein for determining syringe parameters, or for setting the syringe pump in order to be used with a further syringe type encompasses providing a medical syringe pump (here in short: syringe pump) which includes a syringe receptacle with a syringe inserted therein. The syringe includes a syringe cylinder and plunger being movable therein between a first end position and a second end position, wherein the plunger is connected to or includes a plunger rod.

The syringe pump includes a drive unit or a pump motor, for example a syringe motor, e.g., a step motor, and a slide which may be movable by the drive unit in motor steps being, e.g., distinguishable from each other or definable against each other.

The slide includes a toggle for receiving a section of the plunger rod of the syringe or for connecting the toggle thereto. This section may be a press plate which is connected to the plunger rod. A section of the slide, e.g., the toggle, is arranged to be movable by the slide relative to the syringe receptacle maximally between a first end stop and a second end stop. The slide is configured to be moved in motor steps (these could be microsteps or partial steps). The slide is moved along the syringe being inserted in the syringe pump.

Further, the syringe pump includes a counting device for counting the number of motor steps by which the slide is respectively moved, e.g., similar to an odometer. The counting device may optionally count back and forth. It may also be set to zero or another start value.

In addition, the syringe pump includes either one or several sensors or a sensor arrangement, each of which is arranged along a shifting path of the plunger of the syringe or along a movement path of the slide of the pump. They are optionally configured and/or arranged to be in sensor relationship with the slide or with a section thereof.

Moreover, the syringe pump includes a control device which is configured to prompt the drive unit to move the slide according to control instructions. Such control instructions may, for example, be entered by a user using an input device and/or stored by a storage device and read out from the latter and/or calculated by the control device. The syringe pump may be correspondingly configured.

For this purpose and possibly for storing the data detected by the sensors, the calculated position values and/or the determined syringe parameters, the syringe pump includes optionally a correspondingly prepared or configured storage device.

The method described herein further encompasses the following steps:
- a) automatically and/or manually moving the toggle by moving the slide of the syringe pump into a first position. This position corresponds to, or is associated with, a first known nominal volume of the syringe. Subsequently, a position value of the reached, first position is determined by the counting device and set as first position value.
- b) automatically and/or manually moving the toggle by moving the slide of the syringe pump into a second position. This position corresponds to, or is associated with, a second known nominal volume of the syringe. Subsequently, the position value of the second position is determined by the counting device and set as a second position value.
- c) determining the difference or the distance or the value or modulus between the first position value and the second position value, e.g., either as a number of motor steps by which the toggle has been shifted or moved in order to reach the second position starting from the first position, or by the position or positions determined with the aid of the position detectors, determined in an absolute position measuring, e.g., by linear potentiometer.
- d) optionally: calculating a number of motor steps of the drive unit of the syringe pump per nominal volume unit, for example milliliter, or parts thereof with reference to the inserted syringe.

The number of motor steps may be calculated, for example, with the difference or the modulus of the first and the second position value relating to a difference between the first nominal value and the second nominal value, or vice versa. Furthermore, further determined and/or calculated parameters may be included in this calculation. Technical data of the syringe pump, e.g., spindle pitch, step angle, translation, and/or the like may also be part of such a calculation.

In the simplest case, determining a position value may be a simple reading of the count value, for example, if moving the toggle started from a reference point or started many times from the same reference point, respectively, and there the respective starting value of the counting device was, e.g., "0" or another value.

Herein, optionally all components which may be used to determine a position or a position value may be understood as position sensor, e.g., the counting device, the sensors, the sensors of the syringe pump, the optical sensors or magnetic field sensors mentioned herein, the permanent magnets, the Hall sensors, the slotted disk, the alternately magnetized index disk, etc. as well as any combination of two or of any plurality of the components mentioned above.

The speed of the movement may optionally be between 100 µs/microstep and 50000 µs/microstep and may be constant or variable during the movement. For example, the toggle may be automatically moved at a high speed close to the position that should be reached, and then optionally automatically or manually initiated or prompted to reach the respectively aimed position precisely at a lower speed.

A microstep is a step size of the drive unit of the pump; the term may represent a rotation measure or a linear measure.

The medical syringe pump described herein (in short: syringe pump) includes a syringe receptacle. It is designed to receive a syringe, which has a syringe cylinder and a plunger movable therein between a first end position and a second end position, wherein the plunger is connected to a plunger rod.

The syringe pump further includes a drive unit or a pump motor, e.g., a syringe motor or a step motor. The drive unit is provided to move a slide of the syringe pump in motor steps, e.g., being distinguishable or definable from each other. In this, the slide includes a toggle for receiving a section of the plunger rod of the syringe or for connecting the toggle thereto. This section may be a press plate which is connected to the plunger rod. The toggle is arranged to be movable by the slide relative to the syringe receptacle maximally between a first end stop and a second end stop. The slide is configured to be moved in motor steps (these could be microsteps or partial steps) along the syringe inserted in the syringe pump.

Further, the syringe pump includes a counting device for counting the number of motor steps by which the slide is moved, e.g., similar to an odometer which may count back and forth and which may also be set to zero or another start value.

In addition, the syringe pump optionally includes one or several sensors or optionally a sensor arrangement. The sensors or the sensor arrangement may be arranged along a shifting path of the plunger of the syringe or along a movement path of the slide of the syringe pump. They are optionally configured and/or arranged to be in sensor relationship with the slide or with a section thereof.

The syringe pump additionally includes a control device, e.g., as described supra and/or which is configured for prompting the drive unit to move the slide of the syringe pump according to control constructions. The type of control instructions may correspond to the above-stated to which reference is made here in order to avoid repetition.

For this purpose and possibly for storing the data detected by the sensors, the calculated position values and/or the detected syringe parameters, the syringe pump optionally includes a storage device.

The control device of the medical syringe pump as described herein is configured and/or prepared to execute, using the medical syringe pump after inserting the syringe therein, a method, e.g., the method described herein, which encompasses the following steps:
- a) automatically and/or manually moving the toggle by moving the slide of the medical syringe pump into a first position. This position corresponds to, or is associated with, a first known nominal volume of the syringe. Subsequently, a position value of the reached, first position is determined by the counting device as a first position value.
- b) automatically and/or manually moving the toggle by moving the slide of the medical syringe pump into a second position. This position corresponds to, or is associated with, a second known nominal volume of the syringe. Subsequently, the position value of the second position is determined as a second position value by the counting device.
- c) determining the difference or the distance or the modulus between the first position value and the second position value, e.g., either as a number of motor steps that the toggle has been shifted or moved in order to reach the second position starting from the first position, or by the position or positions determined with the aid of the position detector, and d) calculating a number of motor steps of the drive unit of the medical syringe pump per nominal volume unit, for example milliliter, or parts thereof with reference to the inserted syringe.

The statements made supra for determining the position values or for calculating the motor steps, respectively, apply here equally.

The blood treatment apparatus described herein includes, and/or is connected in signal communication to, a medical syringe pump described herein.

A digital, e.g., non-volatile, storage medium described herein, e.g., in the form of a machine readable carrier, in the form of a floppy disk, CD, DVD, EPROM, FRAM (Ferro-electric RAM) or SSD (Solid State Drive), e.g., with electronically or optically readable control signals, can interact with a programmable computer system such that the machine-induced steps of the method described herein are prompted.

A computer program product described herein includes a program code volatile or saved on a machine-readable carrier or a signal wave for prompting the machine-induced steps of the method described herein when the computer program product runs on a computer. A computer program product described herein can be understood as, for example, a computer program which is stored on a carrier, an embedded system as a comprehensive system with a computer program (for example, an electronic device with a computer program), a network of computer-implemented computer programs (for example, a client-server system, a cloud computing system, etc.) or a computer on which a computer program is loaded, running, saved, executed or developed.

The term "machine-readable carrier", as used herein, denotes in certain exemplary embodiments a carrier containing data or information, which is interpretable by software and/or hardware. The carrier may be a data carrier such as a floppy disk, a CD, DVD, a USB stick, a flashcard, an SD card or the like as well as any other storage or any other storage medium mentioned herein.

A computer program as described herein includes a program code for prompting the machine-induced steps of the method described herein, when the computer program runs on a computer. As described herein, a computer program can be understood as, for example, a physical, ready-for-distribution software product, which includes a program.

It is applicable for the digital storage medium described herein, the computer program product described herein and the computer program described herein that all, several or some of the machine-induced steps of the method described herein are prompted. This applies in interaction with a detecting device and/or with a blood treatment apparatus as described herein.

Embodiments according to the present disclosure may include one or several of the features mentioned above or in the following. In this, the features mentioned herein may, in any arbitrary combination, be subject-matter of embodiments according to the present invention, unless the person skilled in the art recognizes a specific combination as technically impossible.

Whenever an embodiment is mentioned herein, it is then an exemplary embodiment.

If it is disclosed herein that the subject-matter of the present disclosure includes one or several features in a specific embodiment, it is also disclosed herein that the subject-matter of the present disclosure expressly does not include this or these feature(s) in other embodiments which are also according to the present disclosure, e.g., in the sense of a disclaimer. For each embodiment mentioned herein, the opposite embodiment, e.g., formulated as a negation, is also disclosed.

The nominal volume, as this term is used herein, is the volume of fluid present in the cylinder when the syringe is loaded to the respective value of the nominal volume (e.g., 5 ml, 10 ml, etc.). The nominal volume of a syringe is usually indicated on the cylinder by a scale, for instance by printing, inscription, impression or the like. The nominal volume serves the physician to administer a quantitative, exactly determinable volume of a fluid by the syringe.

In some embodiments, the first or the second position reached by the syringe pump corresponds into the first end position of the syringe, e.g., the lower end position. At this lower end position, the syringe is completely empty, which is why the nominal volume corresponding to this end position is zero milliliters (ml).

In several embodiments, the method additionally encompasses the automatic and/or manual moving of the toggle into the second end position of the syringe, which is done by moving the slide of the syringe pump. The method further encompasses in these embodiments the determination of a position value of the second end position by the counting device. This is denoted herein as third position value and is optionally stored.

In some embodiments, the toggle or an end section of the slide reaches its maximum positions each time the slide reaches the first end stop or the second end stop, respectively.

Recognizing that the first or the second end stop is reached may be done by a slotted disc or perforated disc which is optionally part of the syringe pump described herein or part of the syringe pump to be calibrated. Said slotted disc may be driven, e.g., via coupling, by the spindle of the syringe pump which in connection with the pump motor drives also the slide in motor steps. The slotted disc intermittently breaks a light barrier signal when it turns, e.g., according to a known pattern. If the slotted disc stops, since the spindle, which drives the slotted disc, stops in turn when it reaches its mechanical end position, then the light barrier signal remains static or deviates in another way from the pattern previously known or expected for a movement state of the slide. The control device of the syringe pump may hereby detect the stoppage of the slotted disc and hereby detect in turn the stoppage of the spindle and consequently of the slide. Thus, one of the end stops is arrived, i.e., reached.

In some embodiments, in the steps a) and/or b) of the method the first and/or the second position is reached starting from the first end stop of the syringe pump. In this, the motor steps needed for reaching the first or the second position are counted.

The first end stop of the syringe pump may be the lower of the two end stops. It may represent the position maximally reachable by the slide in a downward direction (during use of the syringe pump).

In several embodiments of the method, an inner diameter of the syringe is calculated. This may be done in the above-mentioned step d) or may occur before or after said step.

Knowing the inner diameter may be used to determine a step frequency, to monitor the conveyance rate and/or to count a volume.

In some embodiments, the gear dependent and spindle dependent parameters, in particular the spindle pitch s [unit mm/°], the step angle sw [unit: °] and the translation u, are included in the calculation for calculating a thrust height h. In this, the following applies $$h = 1/u * s * sw.$$

Based thereon, the inner diameter $d_i$ may be exemplarily calculated according to the following formula:

$$d_i = \sqrt{\frac{4*V}{\pi * h(\text{Volume})}}$$

with
V=the considered nominal volume
h=the thrust height for conveying the considered nominal volume In some embodiments, the method encompasses in addition the inserting of a syringe standard into the syringe receptacle, e.g., as first, and the method introducing steps. The syringe standard may be used instead of the syringe or before or after the insertion of the syringe into the syringe receptacle as mentioned above. After inserting the syringe standard, the toggle or the slide is moved as far as the syringe sample allows to do so. This movement may optionally be done towards the first or the second end stop, e.g., towards the lower end stop. Upon reaching the maximal position of the slide or the toggle, the position value of the thus reached position is determined within the syringe receptacle or syringe cavity relative to the sensors of the syringe pump. This is denoted herein as position value M.

The spindle of the syringe pump, which converts rotation into linear motion when the syringe is actuated, together with the drive unit and the toggle may also be referred to as a drive mechanism. The location of the syringe receptacle may vary from apparatus to apparatus due to tolerances in its attachment to the drive mechanism. Therefore, it may be useful to determine the position value M of the syringe cavity in some embodiments. It may indicate how the syringe cavity or the syringe receptacle lies with respect to, e.g., the pre-calibrated first or second end stop.

In some embodiments, it may be advantageous to determine the syringe parameters with respect to this position.

In several embodiments, the method further encompasses defining the position value of the first end position, alternatively defining the difference between the position value of the first end position and the position value of the position of the syringe receptacle, as a first syringe parameter. Optionally in this embodiment, the method further encompasses defining the position value of the second end position, alternatively between the position value of the first end position and the position value of the second end position, as a second syringe parameter.

In these embodiments, the method further encompasses defining the difference between a position value of a particular nominal volume (e.g., of the first or second nominal volume) and the position value of the first end position as a third syringe parameter.

In this embodiment, the method again further encompasses transferring at least one value to at least one other medical device. The transferred value is a value of the group that consists of the first, the second, the third syringe parameter, the position value of the first end stop, the determined position value of the first end position, the determined position value of the second end position, the determined position value of the syringe receptacle, references or relations of said position values to each other, distances of the position values between each other, e.g., indicated as differences thereof, and the inner diameter of the syringe.

A transferring may be done via internet, external service programs (e.g., PC service software), a network, a coding (e.g., bar or QR code), e.g., wireless, external data carrier (e.g., USB stick) or also via an input of the parameters in the setup menu of the medical device by a service technician.

In several embodiments, the method further encompasses the step of storing all or some data in the storage device, if available. Data may hereby be determined and/or calculated data and/or values, e.g., the position values mentioned herein or other values of the aforementioned group.

In some embodiments of the method, technical data of the syringe pump, for example, as described above, may also be stored in the storage device.

In order to avoid repetition, reference is made to the above statements for describing the method, which is executed by the correspondingly configured and/or prepared control device of the medical syringe pump described herein. All of the above-mentioned embodiments are conceivable both for the method described herein and analogously also with respect to this method.

In some embodiments, the syringe is a disposable syringe.

In several embodiments, the position detectors or sensors of the syringe pump are calibrated, i.e., the relative position of the movable toggle with respect to the sensors is known, optionally at any time.

Instead of using a light barrier or another optical sensor, the movement and/or the stoppage of the spindle may be detected using at least one differently working sensor, for instance a magnetic field sensor, e.g., a Hall sensor. In this, the above-mentioned slotted disc may be replaced by an alternately magnetized index disc.

Instead of using optical sensors and/or magnetic field sensors, for example, at least one resistance track may be used which functions with loop and resistance track according to the principle of a potentiometer.

In several embodiments, the movement speed of the slide is variable, e.g., it may become slower, for example for precise adjustment. Conditions under which this should be the case may be defined in advance. The deceleration may be used for precise adjustment or for determining the position M. The deceleration serves to minimize the error in determining the respective positions. The control device may be configured or programmed for automated deceleration.

In several embodiments, at least a determined number of motor steps and/or at least one position value is offset with a compensation value in order to enter corrected or compensated in the calculation of the positions that way.

An exemplary compensation may look like the following: Reaching the end stop is exemplarily determined based on the time out or the change of the slotted disc signal expected for a continuous movement of the slide or based on its change.

The time out is obviously dependent on the speed at which the slide is moved during calibration: if moved fast, for instance at a first speed, then a stoppage of the slide is assumed with a time out which lasts, e.g., more than at least 750 ms. If the slide is moved at a second speed, then a stoppage is assumed with a time out which lasts, e.g., more than at least 1500 ms. If it moves slowly, for instance at a third speed, then a stoppage of the slide is assumed with a time out which lasts, e.g., more than at least 3750 ms.

Reaching the end stop may only belated be reliably detected by the time out. This leads to a deviation in the position detection which deviation is different depending on the speed.

In order to eliminate the error caused therethrough, a compensation value which may depend on the speed has been experimentally determined. The determined position values may be corrected by such compensation values.

In some embodiments, the slide of the syringe pump includes a permanent magnet. The latter is in a constant distance to the toggle or to a section of the slide, for instance to the above-mentioned section.

In some embodiments, the medical syringe pump is designed as Heparin syringe pump.

In several embodiments, the blood treatment apparatus is designed as a peritoneal dialysis apparatus, hemodialysis apparatus, hemofiltration apparatus or as hemodiafiltration apparatus, or as an apparatus for the chronic renal replacement therapy or the continuous renal replacement therapy (CRRT).

In some embodiments, the medical syringe pump includes an input device for entering control instructions and/or other data by a user.

In several embodiments, the medical syringe pump includes an output device for outputting treatment data, the determined syringe parameters and/or other data for a user, or it is connected to such an output device, e.g., in a wired or wireless connection.

In some embodiments, providing data and/or values of a calibration process encompasses the inputting of data by a user, the reading out of stored data and/or the like.

In several embodiments, the first end position corresponds to the information or the state "syringe empty".

In several embodiments, the second end position corresponds to the information or to the state "syringe fully or maximally loaded".

In some embodiments, the values determined and/or calculated by the method described herein serve to monitor the conveyance rate of the medical syringe pump and/or to count the volume and/or to implement or control the conveyance rate (motor step frequency).

In several embodiments, the syringe parameters are validated manually by a technician and/or automatically. For this purpose, the newly determined syringe parameters are checked and confirmed by said technician In some embodiments, the first and second end position do not correspond to the first and second end stop, respectively.

In several embodiments, the control device of the syringe pump is programmed in order to effect, during its use as intended, e.g., during treatment of the patient or dispensing of a liquid from the syringe, such as a medicament, the operation of the syringe pump based on the syringe parameters determined as described herein, which are, e.g., stored or saved, or with taking them into account.

In some embodiments, the syringe pump or its control device has no device for storing, for determining and/or for reading in diameters, circumferences or radii of at least one syringe or of its inner lumen. In several embodiments, a storing, determining and/or reading in of diameters, circumferences or radii of syringes is not carried out and/or such parameters are not taken into account.

Some or all of the embodiments according to the present disclosure may include one, several or all of the advantages mentioned above and/or in the following.

The method described herein allows the use of different syringes available on the market at a syringe pump. Advantageously, determining the parameters of the syringe (syringe parameters) that are important to know may be done without significant effort, and, e.g., also automatically by the syringe pump itself. A further advantage of this is that therefore operating software has neither to be reprogrammed nor updated, which always means effort. The setting of the syringe pump such that any number of additional syringes may be used in the treatment of patients in the future, may be carried out or initiated on-site at any time, for example by the user, the clinic or the service technician.

All syringe parameters relevant for the use of the medical syringe pump may be determined by the syringe pump on-site, and partially automatically or with little support by staff or a technician.

The method described herein allows advantageously a free selection of syringe types, for example, for clinics or for dialysis stations, since further syringe types may individually be on-site trained and subsequently used.

The method described herein thus results in an increased flexibility with regard to the selection of the syringes for the clinics and stations.

Another advantage is the possibility to transfer these data also to other medical apparatuses and then to be able to use the syringe type in question also there, without the need to specifically or elaborately set up these other medical devices newly or to determine the syringe parameters or end positions of this syringe type again, even if syringe cavities of different syringe pumps of the same type of apparatus have not been mounted within the respective syringe pump. The transfer of said data may for example be done via internet, by storage media, via a direct input of parameters in the set up or the like.

BRIEF DESCRIPTION OF THE DRAWINGS

The present disclosure is exemplarily explained below with regard to the accompanying drawings in which identical reference numerals refer to the same or similar components. In the figures, the following applies.

DETAILED DESCRIPTION

Figures 1A, 1B:
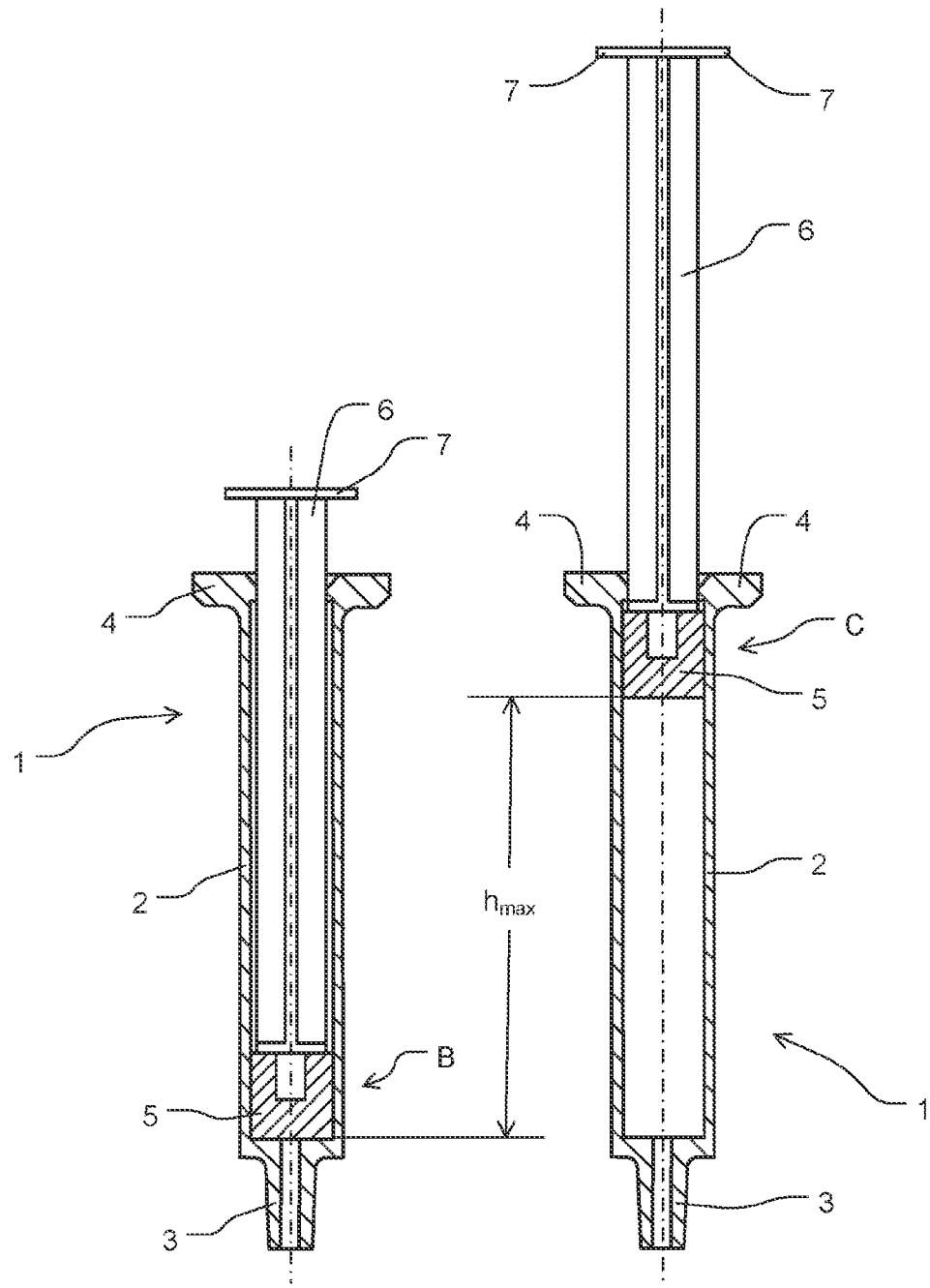
FIG. 1 shows a conventional syringe.

FIG. 1a and FIG. 1b show, each from the side, a conventional syringe 1, e.g., fillable with heparin, which may be a disposable syringe and/or a pre-filled syringe. FIG. 1a shows said syringe in an empty state, FIG. 1b shows it in a completely filled state or the state it takes when it is completely filled.

The syringe 1 includes a syringe cylinder 2 and a plunger 5.

The syringe cylinder 2 includes an optional Luer cone 3 integrally formed on its head side and a syringe flange 4 formed on the opposite end.

The plunger 5 is usually made of an elastomer material and is plug-shaped. It is positioned in the interior of the syringe cylinder 2 and is connected to a plunger rod 6 enabling it to be axially movable within the syringe cylinder 2.

The plunger 5 ends with a usually oval or round press plate 7 when viewed from the top. The press plate 7 is shown from the side in FIG. 1a and FIG. 1b.

In FIG. 1a, the plunger 5 is in a first end position B, in FIG. 1b in a second end position C. The plunger 5 arrives at the first end position B when the syringe content is completely emptied by moving the plunger 5. The plunger 5 arrives at the second end position C when the syringe 1 is filled to the maximum.

The shifting path of the plunger 5 within the syringe 1 is thus limited by the both end positions B and C. The maximum shifting path to be maintained when the syringe 1 is used as intended is herein referred to as $h_{max}$ which is not to be exceeded in order to prevent the plunger 5 from being pulled out of the syringe cylinder 2 and the possible contamination risk associated therewith.

Figure 2:
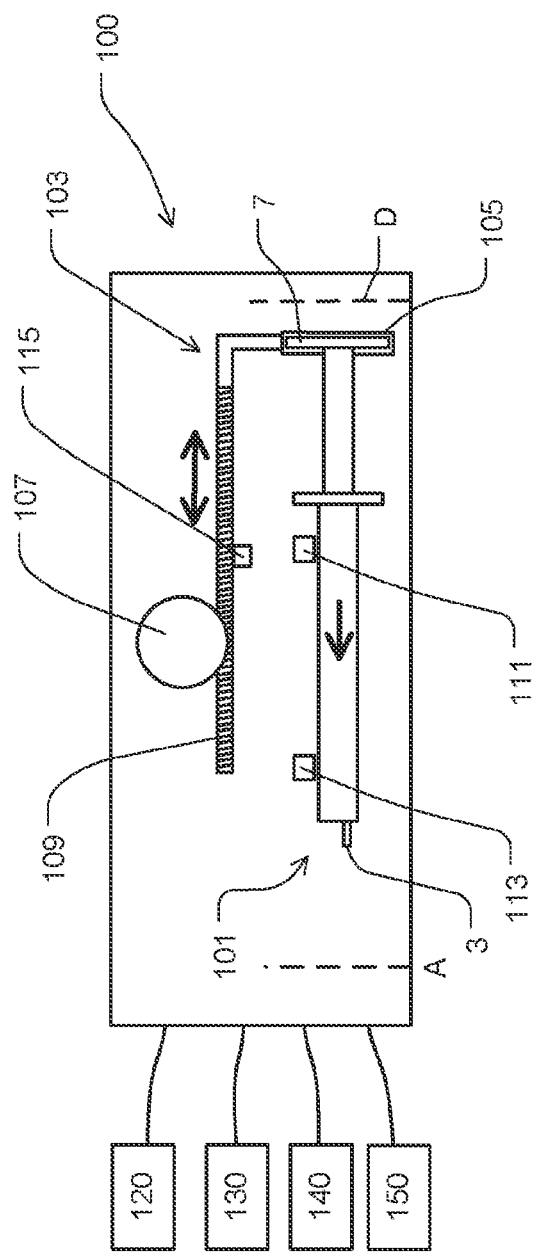
FIG. 2 shows an embodiment of the syringe pump described herein in a schematically simplified top view.

FIG. 2 shows an embodiment of a disclosed syringe pump 100 including a syringe receptacle or a syringe cavity 101. It further includes a movable slide 103 having a toggle 105 being movable together with said slide 103, wherein the toggle 105 is fixed stationary relative to the slide or is a stationary part thereof.

A drive unit 107, herein exemplarily a motor, moves, e.g., via a spindle 109, the slide 103 in motor steps. The direction in which the movement path of the slide 103 extends is indicated by a double arrow.

The movement of the slide 103 comes leftwards (with regard to FIG. 2), i.e. towards the Luer cone 3, latest to a halt or standstill when a first end stop A is reached, which is indicated by a dashed line.

The movement of the slide 103 comes rightwards (with regard to FIG. 2), i.e., towards the push plate 7, latest to a halt when a second end stop D is reached, which is likewise indicated by a dashed line.

The end stops A and D are to be understood as mechanical final stops of the slide 103: moving the slide over or beyond these points A and D is technically impossible, even when no syringe 1 is inserted in the syringe pump 100.

The end stops A and D are each outside the first and second end position B respectively C, described with regard to FIG. 1.

At the syringe receptacle, a first sensor 111 and a second sensor 113 are optionally stationary connected to, e.g., a housing of the syringe pump 100.

The slide 103 in turn may include a permanent magnet 115 which may serve to detect, in known manner, in interaction or alternation with the first sensor 111 and/or the second sensor 113, if or when the slide 103 reaches the position of the first sensor 111 or of the second sensor 113 or passes by. The first and the second sensor 111 or 113 are therefore optionally configured as Hall sensors. Evaluation devices required for determining or evaluating the signals received from the Hall sensors or from other sensors are provided.

As an alternative to configuring the sensors 111 and 113 as Hall sensors, another sensor arrangement could also alternatively be provided, optionally encompassing absolute position detectors. Also combinations of sensors, e.g., of a Hall sensor and a light barrier are likewise contemplated by the present disclosure.

Further contemplated by the present disclosure is that, e.g., both sensors 111 and 113, or any one of them, are stationary with the slide 103, and move together with the latter when it is being moved. In such embodiments, the permanent magnet 115 may be positioned at the syringe receptacle.

The syringe pump 100 further includes a counting device 120, a control device 130, optionally a storage device 140 and optionally an input/output device 150 or is respectively connected thereto in signal communication, as indicated in FIG. 2.

FIG. 2 shows a syringe pump 100 having a syringe 1 inserted therein. This common illustration serves for a better explanation of the interaction of the syringe pump 100 during the intended use of the syringe pump 100 or the syringe 1 respectively. For the method disclosed herein, the syringe 1 must be at least temporarily inserted into the syringe pump 100.

FIGS. 3a to 3d show the course of the method described herein in an exemplary embodiment with reference to different syringe positions in a juxtaposition.

Figures 3A, 3B, 3C, 3D:
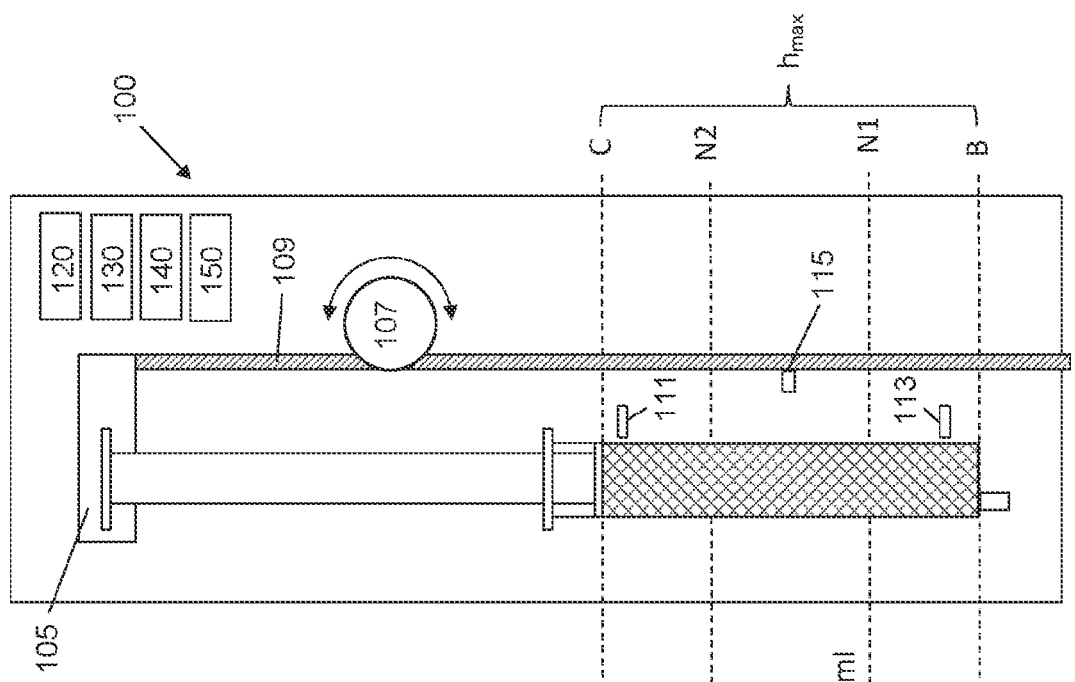
FIG. 3a bis 3d show the course of the method described herein in an exemplary embodiment in a summary.

FIGS. 3b and 3c show, in addition to the two syringe states of FIG. 1, namely "syringe empty" (FIG. 3a) and "syringe completely loaded" (FIG. 3d), two further states, namely the syringe in the method step a) (FIG. 3b) in which the toggle 105 shown only in FIG. 3d has been moved to a first known nominal volume N1 (e.g., 5 ml) and the syringe in the method step b) of the method (FIG. 3c) in which the toggle 105 has been moved to a second known nominal volume N2 (e.g., 15 ml).

Conventional syringes are usually scaled, labeled and/or printed or imprinted on their exterior. This information, referred to herein as nominal volumes, for example milliliters, allow the user, e.g., to detect the loading level of the syringe and/or optionally to dose a dispensary of the content and/or to monitor a dosage.

In order to obtain the clarity of FIG. 3, the connection of the syringe 1 to the syringe pump 100 has been exemplarily shown only in FIG. 3d. The illustration made there applies analogously also to the three other syringe states of FIGS. 3a to 3d. FIG. 3d illustrates that the counting device 120, the control device 130, the storage device 140 and the input/output device 150 can also be integrated into the syringe pump 100.

FIGS. 3a to 3d illustrate examples of determined syringe parameters SP1, SP2 and SP3. Thus, in this example, the syringe parameter (SP1) corresponds to the first end position (B) (and moreover to a nominal volume of zero ml), the second syringe parameter (SP2) corresponds to the second end position (C) and the third syringe parameter (SP3) is determined from the difference between, e.g., the nominal volume (here: N1) and the first end position (B). These syringe parameters are respectively determined when the plunger 5 of the syringe 1 being moved by the drive unit 107 in the direction indicated by the respective arrow reaches the first end position B, the second end position C or a known nominal volume (here N1) of the syringe 1. The determination of the syringe parameters SP1 to SP3 is shown purely by way of example here.

If one sets the difference of the nominal volumes ΔN in relation to the number of motor steps required for the movement of the toggle 105 over the distance between the two considered nominal volumes, a number of motor steps per unit nominal volume (e.g., per ml) can be determined directly.

The syringe parameters SP1, SP2 and/or SP3 may, optionally in addition to other parameters, like for example a calculated inner diameter of the syringe or a position value (M) of the syringe cavity or respectively the reference or distance of each to one of the aforementioned values or a further value, like the first end stop (A) or a first end position (B), e.g., when indicated as differences between any of the aforementioned measurements, be transferred to other medical apparatuses in order to save a recalibration or resetting of the apparatus to the syringe type shown in FIGS. 3a to 3d.

The difference between the first syringe parameter SP1 and the second syringe parameter SP2 may be understood as a measure of a lift height or a maximal movement path of the toggle 105 when using a syringe of the particular syringe type.

Not shown in the figures is the possibility to move the toggle with inserted syringe standard so far against the lower end stop A, until a further movement is mechanically no longer possible. The counting value of motor steps (measured from or relative to the position of the lower end stop A) read after stopping the slide in this position, is further used as position M. The position M may indicate where—relative to further components of the syringe pump, for instance relative to the lower end stop A—the syringe cavity or syringe receptacle is positioned. The value M may be corrected, for instance by the compensation value mentioned herein.

The first syringe parameter SP1 may be determined herein as the difference between M and B or as a difference between A and B in arbitrary embodiments and independent of further features.

The second syringe parameter SP2 may herein be determined as the difference between B and C or as a difference between A and C in arbitrary embodiments and independent of further features.

The third syringe parameter SP3 may be determined herein as the difference between B an N1 or N2 in arbitrary embodiments and independent of further features.

As stated above, it is possible to set the counting device 120 to zero when the respective positions are reached, and then to take the determined counting values directly as parameter values for the respective syringe.

LIST OF REFERENCE NUMERALS 1 syringe
2 syringe cylinder
3 Luer cone
4 syringe flange
5 plunger
6 plunger rod
7 press plate
100 syringe pump
101 syringe receptacle or syringe cavity
103 slide
105 toggle
107 drive unit, motor
109 spindle
111 first sensor
113 second sensor
115 permanent magnet
120 counting device
130 control device
140 storage device
150 input/output device
A first end stop
B first end position
C second end position
D second end stop
M position of the syringe cavity
N1 first nominal volume
N2 second nominal volume
ΔN distance between the first and the second nominal volume
P1 first position
P2 second position
SP1 first syringe parameter
SP2 second syringe parameter
SP3 third syringe parameter
$h_{max}$ maximum shifting path of the plunger or of the plunger rod inside the syringe cylinder when the syringe is used as intended; the maximum shifting path is determined such that an undesirable pulling or withdrawal of the plunger out of the cylinder is avoided;

The invention claimed is:

1. A method for determining syringe parameters, wherein the method comprises:
 providing a medical syringe pump which comprises:
  a syringe receptacle having a syringe inserted therein, wherein the syringe comprises a syringe cylinder and a plunger being movable therein between a first end position and a second end position, wherein the plunger is connected to a plunger rod;
  a drive unit, provided for moving a slide of the medical syringe pump in motor steps, wherein the slide comprises a toggle for receiving a section of the plunger rod or for connecting thereto, and is arranged to be movable, relative to the syringe receptacle, with a section of the slide maximally between a first end stop and a second end stop;
  a counting device for counting a number of motor steps by which the toggle has been moved;
  one or more sensors or a sensor arrangement, arranged along a shifting path of the plunger or along a movement path of the slide;
  a control device, configured for prompting the drive unit to move the slide according to control instructions; and
  a storage device;
 moving the toggle by moving the slide of the medical syringe pump to a first position which corresponds to, or is associated with, a first known nominal volume of the syringe, and determining a position value of the first position by the counting device as a first position value;
 moving the toggle by moving the slide of the medical syringe pump to a second position which corresponds to, or is associated with, a second known nominal volume of the syringe, and determining a position value of the second position by the counting device as a second position value;
 determining a difference between the first position value and the second position value either as the number of motor steps by which the toggle has been moved to reach the second position starting from the first position, or by the position value determined with the aid of position detectors; and
 calculating another number of motor steps of the drive unit of the medical syringe pump per nominal volume unit of the inserted syringe based on the difference.

2. The method according to claim 1, wherein the first position or the second position is the first end position.

3. The method according to claim 1, wherein the method further comprises:
 moving the toggle by moving the slide of the medical syringe pump into the second end position of the syringe; and
 determining a position value of the second end position by the counting device as a third position value.

4. The method according to claim 1, wherein the first position and/or the second position is reached starting from the first end stop of the medical syringe pump while counting the motor steps needed for reaching the first position or the second position.

5. The method according to claim 1, wherein an inner diameter of the syringe is additionally calculated.

6. The method according to claim 1, further comprising:
inserting a syringe standard into the syringe receptacle;
moving the toggle or the slide, as far as the syringe allows to do so; and
determining a position value of a position of the syringe receptacle relative to the sensors of the medical syringe pump.

7. The method according to claim 6, further comprising:
defining the position value of the first end position or a difference between the position value of the first end position and the position value of the position of the syringe receptacle as a first syringe parameter;
defining a difference between a position value of a nominal volume and the position value of the first end position as a third syringe parameter; and
transferring, to at least one other medical device, at least one value of a group that comprises: the first syringe parameter, a second syringe parameter, the third syringe parameter, the position value of the first end stop, the determined position value of the first end position, the determined position value of the second end position, the determined position value of the syringe receptacle, references of the position values to each other, distances or differences between any of the first syringe parameter, the second syringe parameter, and the third syringe parameter and position values with each other, and an inner diameter of the syringe.

8. The method according to claim 7, further comprising defining the position value of the second end position or a difference between the position value of the first end position and the position value of the second end position as the second syringe parameter.

9. The method according to claim 1, further comprising saving all or some of the determined and/or calculated data and/or values in the storage device.

10. A medical syringe pump comprising:
a syringe receptacle for a syringe insertable therein, wherein the syringe comprises a syringe cylinder and a plunger being movable therein between a first end position and a second end position, wherein the plunger is connected to a plunger rod;
a drive unit provided to move a slide of the medical syringe pump in motor steps, wherein the slide comprises a toggle for receiving a section of the plunger rod or connecting thereto and is arranged to be movable with a section of the slide, relative to the syringe receptacle, maximally between a first end stop and a second end stop;
a counting device for counting a number of motor steps by which the toggle has been moved;
one or more sensors or a sensor arrangement, arranged along a shifting path of the plunger or along a movement path of the slide;
a control device, configured for prompting the drive unit to move the slide according to control instructions; and
a storage device, wherein the control device is configured and/or prepared for executing or triggering a method for determining syringe parameters of the syringe inserted in the medical syringe pump using the medical syringe pump, the method comprising:
moving the toggle by moving the slide of the medical syringe pump into a first position which corresponds to, or is associated with, a first known nominal volume of the syringe, and determining a position value of the first position by the counting device as a first position value;
moving the toggle by moving the slide of the medical syringe pump into a second position which corresponds to, or is associated with, a second known nominal volume of the syringe, and determining a position value of the second position by the counting device as a second position value;
determining a difference between the first position value and the second position value either as the number of motor steps by which the toggle has been moved in order to reach the second position starting from the first position, or by the position or positions determined by position detectors; and
calculating another number of motor steps of the drive unit of the medical syringe pump per nominal volume unit of the inserted syringe based on the difference.

11. The medical syringe pump according to claim 10, wherein the first position or the second position is the first end position.

12. The medical syringe pump according to claim 10, wherein the method further comprises moving the toggle by moving the slide of the syringe into the second end position of the syringe; and determining a position value of the second end position as a third position value by the counting device.

13. The medical syringe pump according to claim 10, wherein the first position and/or the second position is reached starting from the first end stop of the medical syringe pump while counting the motor steps needed for reaching the first position or the second position.

14. The medical syringe pump according to claim 10, wherein an inner diameter of the syringe is additionally calculated.

15. The medical syringe pump according to claim 10, wherein the method further comprises:
inserting a syringe standard into the syringe receptacle;
moving the toggle or the slide, as far as the syringe sample allows to do so; and
determining a position value of a position of the syringe receptacle relative to the sensors of the medical syringe pump.

16. The medical syringe pump according claim 15, wherein the method further comprises:
defining the position value of the first end position or a difference between the position value of the first end position and the position value of the position of the syringe receptacle as a first syringe parameter;
defining a difference between a position value of a nominal volume and the position value of the first end position as a third syringe parameter; and
transferring, to at least one other medical device, at least one value of a group comprising: the first syringe parameter, a second syringe parameter, the third syringe parameter, the position value of the first end stop, the determined position value of the first end position, the determined position value of the second end position, the determined position value of a position of the syringe receptacle, references of the position values to each other, distances between any of the aforementioned position values with each other, and an inner diameter of the syringe.

17. The medical syringe pump according to claim 16, wherein the method further comprises defining the position value of the second end position or a difference between the position value of the first end position and the position value of the second end position as the second syringe parameter.

18. The medical syringe pump according to claim 10, wherein the method further comprises saving all or some of the determined and/or calculated data and/or values in a chronic renal replacement therapy or a continuous renal replacement therapy (CRRT), storage device.

19. A blood treatment apparatus comprising, or being connected in signal communication to, the medical syringe pump according to claim 10.

20. The blood treatment apparatus according to claim 19, wherein the blood treatment apparatus is a peritoneal dialysis apparatus, a hemodialysis apparatus, a hemofiltration apparatus, a hemodiafiltration apparatus, or an apparatus for a chronic renal replacement therapy or a continuous renal replacement therapy (CRRT).

* * * * *